(12) United States Patent
Deliwala et al.

(10) Patent No.: US 12,430,635 B2
(45) Date of Patent: Sep. 30, 2025

(54) SYSTEMS AND METHODS FOR AN ACCOUNT ISSUER TO MANAGE A MOBILE WALLET

(71) Applicant: American Express Travel Related Services Co., Inc., New York, NY (US)

(72) Inventors: Manish K. Deliwala, Chandler, AZ (US); Rajesh K. Namboodiri, Phoenix, AZ (US); Keshav A. Narsipur, Chandler, AZ (US); Huei Ong, New York, NY (US); Santhosh R. Rao, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 778 days.

(21) Appl. No.: 14/975,235

(22) Filed: Dec. 18, 2015

(65) Prior Publication Data
US 2016/0364721 A1    Dec. 15, 2016

Related U.S. Application Data

(60) Provisional application No. 62/175,181, filed on Jun. 12, 2015.

(51) Int. Cl.
*G06Q 20/36* (2012.01)
*G06F 16/903* (2019.01)
*G06Q 20/38* (2012.01)

(52) U.S. Cl.
CPC ....... *G06Q 20/36* (2013.01); *G06F 16/90335* (2019.01); *G06Q 20/385* (2013.01)

(58) Field of Classification Search
CPC ....... G06F 2221/0711; G06F 16/90335; G06Q 20/36; G06Q 20/385
See application file for complete search history.

(56) References Cited

U.S. PATENT DOCUMENTS

| | | | |
|---|---|---|---|
| 5,414,841 A * | 5/1995 | Bingham | G06F 17/30949 |
| 8,977,569 B2 | 3/2015 | Rao | |
| 2004/0250082 A1 * | 12/2004 | Li | H04L 9/3247 713/181 |

(Continued)

FOREIGN PATENT DOCUMENTS

GB    2403579 A  *  1/2005  ............. G06Q 40/04

OTHER PUBLICATIONS

Power Carol, Two More Sites Set to Add Account Aggregation. (Security First Network Bank and Women's Financial Network Inc., The American banker, Feb. 2000, vol. 165 (40), p. 10-10.*

(Continued)

*Primary Examiner* — Ilse I Immanuel

(57) ABSTRACT

A system may be configured to perform operations and/or steps comprising querying, by an issuer server, a network server for an alias associated with a transaction account. The issuer server may receive the alias from the network server. The issuer server may also send the alias to an issuer application. The operations may also comprise validating, by the issuer server, an account validation input entered into the issuer application. The issuer server may send an issuer signature criteria that indicate whether the account validation input is valid. The issuer application may add an alias associated with the account to a digital wallet.

20 Claims, 4 Drawing Sheets

(56) References Cited

U.S. PATENT DOCUMENTS

| | | |
|---|---|---|
| 2013/0268437 A1 | 10/2013 | Desai et al. |
| 2013/0346302 A1 | 12/2013 | Purves et al. |
| 2014/0129435 A1 | 5/2014 | Pardo et al. |
| 2015/0019417 A1 | 1/2015 | Andrews et al. |
| 2015/0019443 A1* | 1/2015 | Sheets .................. G06Q 20/326 705/71 |
| 2015/0046339 A1 | 2/2015 | Wong et al. |
| 2015/0120472 A1 | 4/2015 | Aabye et al. |
| 2015/0220914 A1* | 8/2015 | Purves ................. G06Q 20/405 705/41 |
| 2015/0262180 A1* | 9/2015 | Hambleton ........ G06Q 20/3821 705/71 |
| 2015/0310432 A1* | 10/2015 | Pusuluri ................. G06Q 40/02 705/71 |
| 2016/0125396 A1* | 5/2016 | Brickell ............... G06Q 20/367 705/67 |
| 2016/0335625 A1* | 11/2016 | Ko ..................... G06Q 20/3674 |
| 2016/0335626 A1 | 11/2016 | Ko et al. |

OTHER PUBLICATIONS

International Search Report and Written Opinion dated Sep. 9, 2016 in Application No. PCT/US2016/036158.

Bleumer, "Electronic Wallet," Research Gate Conference Paper, Nov. 8, 2003, 11 pages, retrieved om Jul. 27, 2016 from https://www.researchgate.net/profile/Oded_Goldreich/publication/221354863_Electronic_Wallet/links/0c96053b691d249ebd000000.pdf.

International Preliminary Report on Patentability dated Feb. 24, 2017 in Application No. PCT/US2016/036158.

\* cited by examiner

SYSTEMS AND METHODS FOR AN ACCOUNT ISSUER TO MANAGE A MOBILE WALLET

CROSS-REFERENCE TO RELATED APPLICATIONS

This Non-Provisional Patent Application claims priority to U.S. Provisional Patent Application Ser. No. 62/175,181, filed Jun. 12, 2015 and entitled "SYSTEMS AND METHODS FOR AN ACCOUNT ISSUER TO MANAGE A MOBILE WALLET," all of which is incorporated herein in its entirety.

FIELD

The present disclosure relates to mapping and routing, and digital wallet validation.

BACKGROUND

Digital wallets streamline the payment protocol for purchases both online and in store. As more users acquire digital devices, the availability of digital wallet applications increases. Digital wallet management, however, can be unwieldy. Users may be prompted to provide account information, but the account information alone may not be enough to securely add the account to a digital wallet. Users may further have an authorization telephone call with an account issuer to validate the user's digital wallet request. Security steps such as authorization phone calls may seem unnecessary to many users and thereby prevent the user from using the available digital wallet services.

Many account-issuing banks provide their members with servicing applications. Servicing applications typically provide users with access to their own sensitive information and the ability to perform some transactions. As such, the servicing applications may authenticate users with the issuing bank. Although the user is authenticated, the servicing applications may not offer the ability to add an account serviced by the issuing bank to the user's digital wallet. Thus, users may still authenticate and manage the digital wallet in an unwieldy manner.

SUMMARY

A system, method, and computer readable medium (collectively, the "system") is disclosed for managing a digital wallet. The system may be configured to perform operations and/or steps comprising querying, by an issuer server, a network server for an alias associated with a transaction account. The issuer server may receive the alias from the network server. The issuer server may also send the alias to an issuer application. The system may also comprise validating, by the issuer server, an account validation input entered into the issuer application. The issuer server may send an issuer signature criteria that indicates whether the account validation input is valid. However, the issuer signature may not be tied to the device, but may be encrypted and include account validation elements similar to a checklist. The issuer server may invoke a function on the issuer application to add the alias to a digital wallet.

In various embodiments, the alias may comprise a string of characters and/or may have the structure of an account number. The system may comprise storing, by the issuer application, the alias on a mobile device running the issuer application. The issuer server may validate a security code. The issuer signature criteria may indicate whether the security code is valid. The issuer server may be configured to communicate with the network server using an application program interface (API).

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
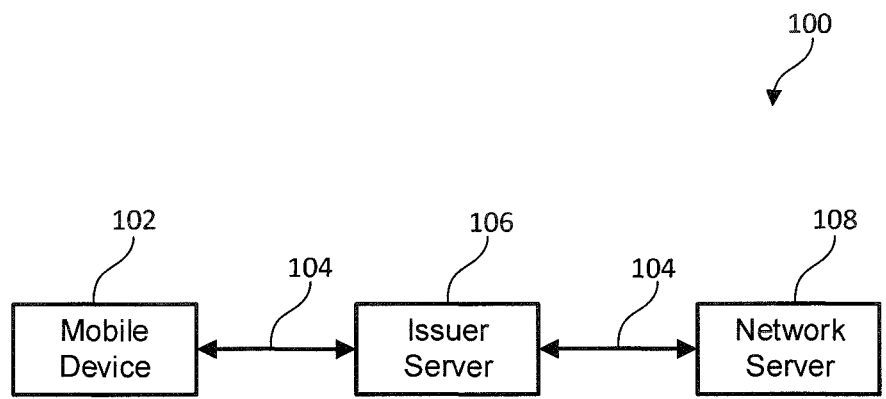
FIG. 1 illustrates an exemplary system for user validation and wallet management, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, transaction account holder, card member or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the card member may include a transaction account owner, a transaction account user, an account affiliate, a child account user, a subsidiary account user, a beneficiary of an account, a custodian of an account, and/or any other person or entity affiliated or associated with a transaction account.

As used herein, a "digital wallet" includes a software and/or electronic device that facilitates individual e-commerce and m-commerce transactions. The digital wallet may operate by aggregating the transaction account holder's payment and billing information and serving as the merchant of record, and/or passing through the transaction account holder's payment and billing information to the end merchant. Examples of digital wallets currently available may include Apple Pay®, Passbook®, and Google Wallet™.

The present disclosure provides a system, method, and computer program product for managing a digital wallet via a separate transaction account issuer application. The transaction account issuer application may map and route account data securely to the digital wallet on various digital devices. In that regard, the transaction account issuer may enable a user to add accounts to the digital wallet using a third party application provided by the transaction account issuer as an alternative to the digital wallet application itself. The systems in the present disclosure may enable communication of sensitive information without having to send sensitive issuer data or network data over an unsecured network. Applications of the present disclosure may thus enhance security of digital wallet management, enhance the user experience and expedite processing.

With reference to FIG. 1, system 100 for digital wallet management is shown, in accordance with various embodiments. System 100 may comprise a user device 102. User device 102 may comprise any device capable of receiving and displaying an electronic message via network 104. For example, user device 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over network 104. User device 102 may communicate over network 104 with issuer server 106.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

In various embodiments, user device 102 may interact with issuer server 106 to provide backend functionality for an application operating on user device 102. The application operating on user device 102 may be a transaction account application operating with issuer server 106 where the issuer is the transaction account issuer. The transaction account application may be a native application running on user device 102 to service transaction account holders for accounts issued by the issuer. The transaction account application may be referred to herein as a "bank app" or "issuer app," and issuer server 106 may be referred to as a "bank server." Issuer server 106 may provide transaction account information and user information to user device 102 for use in the transaction account application. The issuer server 106 may also be referred to herein as "issuer server 106." For example, issuer server 106 may be a server maintained by an issuer to provide transaction account numbers for transaction accounts issued by the issuer. Issuer server 106 may also communicate over network 104 with network server 108.

In various embodiments, network server 108 may be an enterprise digital wallet hub for managing the issuance and life cycle of tokens on smart devices. Network server 108 may provide alias information for mapping and routing of account information as well as issuer signature validation, which are both described in detail below. Network server 108 may include a single computer or a distributed cluster of computers operating in concert to provide the functionality described herein.

Figure 2:
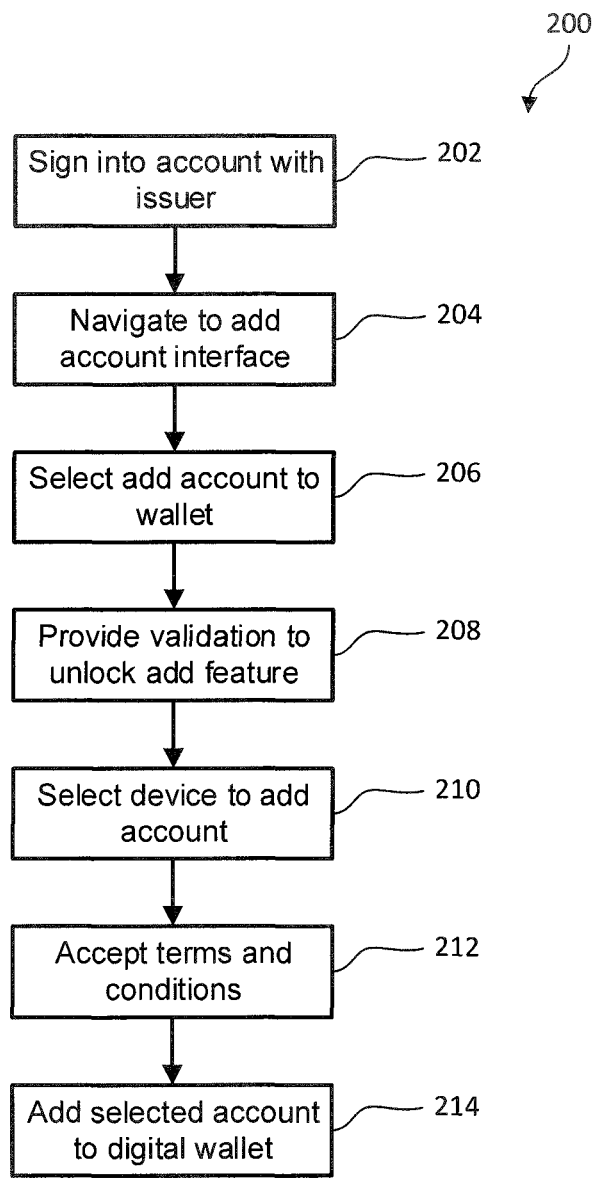
FIG. 2 illustrates a process flow for an issuer application to manage a digital wallet, in accordance with various embodiments.

In various embodiments, and with reference to FIG. 2, a block diagram depicting a process flow of an account management system 200 (system 200) is shown. Initially, a user may sign into an account with an issuer via an issuer app running or web interface running on user device 102 (Step 202). The user may enter a username and password into the issuer app when prompted and the issuer app may then authenticate the login information by communicating with issuer server 106. The user may then navigate to an add account interface in the issuer app or web interface (Step 204). The user may then select to add an account to a wallet (Step 206). A list of accounts (which may be in the form of transaction card images) available to be added may be presented to the user. The list of available cards and/or accounts may be obtained from issuer server 106 using a mapping and routing process as described below with reference to FIG. 3.

In various embodiments, the user may then provide validation to unlock the add feature (Step 208). The issuer app may prompt the user for additional validation input. For example, the issuer application may prompt the user for a dynamic password, a movement, an input, a security code, a social security number or portion thereof, and/or biometric. A dynamic password may be a numeric or alphanumeric code delivered to the user for entry into the issuer app. Validation may be confirmed by issuer server 106 and network server 108 as described below with reference to FIG. 4. The user may then select a device to add the account (Step 210). The account may be added to one or more devices including user device 102.

In various embodiments, the user may then accept terms and conditions (Step 212). The terms and conditions may be terms relevant to the issuer app or digital wallet presented to the user on user device 102. The issuer app running on user device 102 may then add the selected account to the digital wallet (Step 214). The issuer app may add the account in response to issuer server 106 invoking a function of the issuer app. The issuer app may use an application program interface (API) provided by the digital wallet, also running on user device 102, for interaction with third party applications such as the issuer app.

Figure 3:
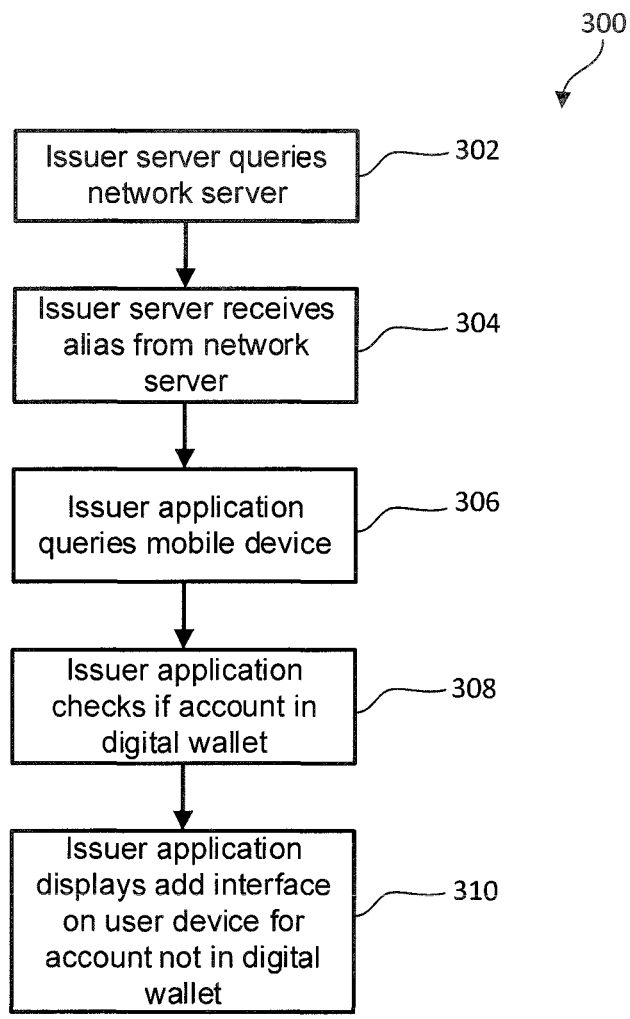
FIG. 3 illustrates a process for mapping and routing accounts in a digital wallet, in accordance with various embodiments.

With reference to FIG. 3, a block diagram depicting a process flow of a mapping and routing system 300 is shown, according to various embodiments. System 300 may interact with system 200 as a subroutine triggered by the steps of system 200. In response to a user navigating to an add account interface in Step 204 of FIG. 2, the issuer server 106 may query the network server (Step 302) to retrieve an account identifier such as an account alias and/or anything else that may identify an account. The account alias may be mapped to an account number. An account number may be a transaction account number (i.e., the 15 or 16 digit account number on the front of a credit card or charge card), for example, identifying the issuing bank and the associated transaction account.

In various embodiments, an alias may be used to avoid sending the transaction account number over a network and reduce the footprint in case of a security breach. The alias may include an account reference ID that is mapped to identify the transaction account and an issuing bank ID. The alias may meet all the rules for a transaction account number, such as including an issuing bank ID of the specified length, a transaction account number of the specified length, and/or a check digit as appropriate. In that regard, the alias may have the form and structure of a valid transaction account number (i.e., pass a structure checking algorithm) and behave like a valid transaction account number when used in interfaces (e.g., web applications and web sites) that check the structure of the account number, but the alias may not be associated with a transaction account. The alias may be an on-file storable token created using an algorithm kept secret on network server 108. The network server 108 may be able to convert the alias into the transaction account number as well as convert the transaction account number into the alias.

In various embodiments, an alias may also comprise a string containing non-numeric values. The string may be created using an algorithm kept secret on network server 108. In that regard, the alias may comprise a string of characters mapped to the transaction account number. The alias comprising non-numeric characters that are mapped (and without following transaction account number structure) may not be compatible with some web applications or web sites that require a transaction account number that passes a validation test.

In various embodiments, the issuer server 106 may receive an alias from the network server 108 (Step 304). The alias may be newly generated or a previously generated alias. Communication between network server 108 and issuer server 106 may be facilitated using a normalized API. The API may specify the available functionality for interacting with network server 108 and requirements for using that functionality. The API may be made available to the transaction account issuer for use in creating an issuer app and/or issuer server 106 that interacts with the network server 108. In that regard, more than one issuer app and issuer server 106 maintained by multiple transaction account issuers may interact with network server 108. The API may enable the use of aliases mapped to account numbers rather than account numbers themselves.

In various embodiments, the issuer application may query user device 102 (Step 306). The query may be a request to the mobile device and/or digital wallet to retrieve a list of accounts already present in the digital wallet, if any. The issuer application may then check if an account is in a digital wallet (Step 308). The issuer application may interact with the digital wallet and/or user device 102 using another API provided to facilitate interaction with the digital wallet or user device 102. The issuer application may then display an add interface for an account not in the digital wallet (Step 310). A user may then use the add interface displayed on user device 102 to select add an account to wallet in Step 206 of FIG. 2.

Figure 4:
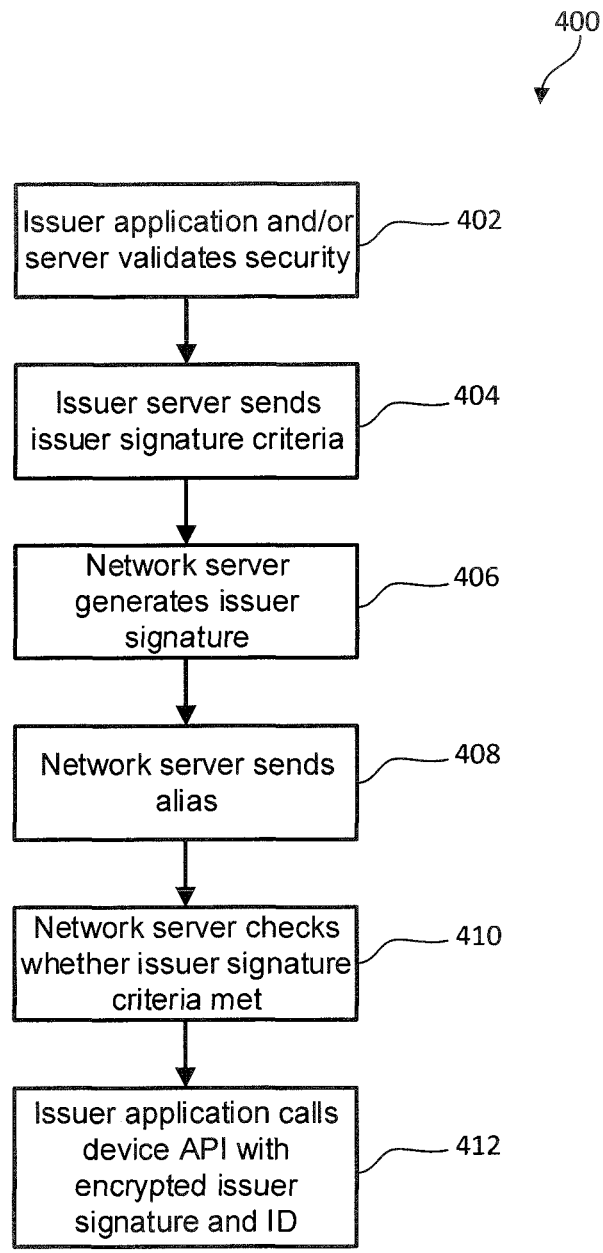
FIG. 4 illustrates a process for validating security to unlock an add account feature, in accordance with various embodiments.

With reference to FIG. 4, a block diagram depicting a process flow of a validation system 400 (system 400) is shown, according to various embodiments. System 400 may interact with system 200 as a subroutine triggered by the steps of system 200. In response to a user providing validation to unlock the add feature in Step 208 of FIG. 2, the issuer application or the issuer server 106 may validate security (Step 402). The issuer app may prompt the user for a dynamic password, a movement, an input, an account/card security code, a social security number or portion thereof, and/or biometric, as described above. For example, the issuer app may further prompt the user for an account/card security code, which may be located on the back of the card (also referred to on some accounts as a CID, CVV2, CVC, or CVC2). The issuer app may also prompt the user for the last digits of a social security number or a dynamic password.

In various embodiments, issuer server 106 may then send an issuer signature criteria to network server 108 (Step 404). The issuer signature criteria may include binary information as to whether various forms of transaction account holder verification was successfully performed or not. For example, the issuer signature criteria may contain a binary flag indicating that an account security code (e.g., a CID) was validated as well as the CID provided. The issuer signature may further be a time bounded signature that is no longer valid after a predetermined duration. The issuer signature may also be a unique session key identifiable only between network server 108 and issuer server 106. In that regard, the issuer signature may be generated using a private key present on network server 108 and/or issuer server 106. The issuer server may contain dynamic values and/or criteria that may also be adjusted over time. The issuer signature content is dynamic and may change over time. For example, the security code may be included today, and next year the issuer signature may include the security code and the zip code. The network server may generate an issuer signature (Step 406) using the issuer signature criteria. In various embodiments, the issuer server may generate the issuer key as well and provide the issuer key to the network server. Network server 108 may also send an alias (Step 408).

In various embodiments, network server 108 may check whether the issuer signature criteria are met (Step 410). Network server 108 may terminate the account adding process in response to a determination that the issuer signature criteria (e.g., the security code or a portion of a social security number) are not validated. Network server 108 may communicate the issuer signature and alias or account number back to the issuer server 106 and the issuer app running on user device 102. The issuer signature and/or the alias may be encrypted during communication. The issuer application may call a device API with the encrypted issuer signature and ID (Step 412) in response to the user selecting a device to add the account in Step 210 of FIG. 2. The ID may comprise an account reference ID and/or an account alias, such as a FPANID received by network server 108 from issuer server 106. An API call may request from the issuer server 106 and/or network server 108 that the issuer signature and payload be encrypted and returned to the issuer application. Thus, the system may provide a secured process for adding an account to a digital wallet using a third-party application such as a bank's account servicing application.

The systems and methods herein enable secure addition of accounts or account information to a digital wallet by a third party application. Transaction account issuers may provide users with an integrated experience in their own banking apps and streamline digital wallet management.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The phrases consumer, customer, user, account holder, account affiliate, account member or the like shall include any person, entity, business, government organization, business, software, hardware, machine associated with a transaction account, buys merchant offerings offered by one or more merchants using the account and/or who is legally designated for performing transactions on the account, regardless of whether a physical account is associated with the account. For example, the account member may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, and JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone account, embossed account, smart account, magnetic stripe account, bar code account, transponder, radio frequency account or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, account, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart account"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, a motion, a measurement and/or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit account companies, account sponsoring companies, or third party issuers under contract with financial institutions. It is further noted that other participants may be involved in some phases of the transaction, such as an intermediary settlement institution.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:

providing, by an issuer server, a list of available transaction accounts to be added to a digital wallet application;

in response to a user navigating to an add account interface, retrieving, by the issuer server, an alias of a transaction account from a network server;

determining, by an issuer application, that the transaction account is not associated with the digital wallet application based on a comparison of the alias with a list of transaction accounts corresponding to the digital wallet application;

in response to the determining that the transaction account is not associated with the digital wallet application, displaying, by the issuer application, an add interface for an account not in the digital wallet application;

receiving, by the issuer server, a message from the issuer application indicating a selection to add the transaction account to the digital wallet application;

receiving, by the issuer server, a plurality of validation inputs from the user to unlock an add feature, wherein the issuer server receives the plurality of validation inputs from the issuer application;

determining, by the issuer server, that one or more validation inputs of the plurality of validation inputs match respective expected validation values;

in response to the determining that the one or more validation inputs match the respective expected validation values, sending, by the issuer server, issuer signature criteria to the network server, wherein the issuer signature criteria comprises binary information identifying that the one or more validation inputs match the respective expected validation values;

generating, by the network server, an issuer signature using the issuer signature criteria;

verifying, by the network server, the issuer signature criteria;

transmitting, by the network server, the alias of the transaction account and the issuer signature to the issuer application; and adding, by the issuer application, the transaction account to the digital wallet application.

2. The method of claim 1, wherein the alias has a structure of a valid transaction account number and comprises a same number of characters for an issuing bank identifier, a check digit, and a same number of characters for a transaction account number corresponding to the transaction account.

3. The method of claim 1, wherein the alias has a structure of a valid transaction account number and complies with criteria of a structure checking algorithm.

4. The method of claim 1, wherein the alias comprises an on-file storable token, and the network server converts the alias into the transaction account number and the transaction account number into the alias.

5. The method of claim 1, wherein the issuer application is provided by an issuer of the transaction account, and wherein the issuer application is different from the digital wallet application.

6. The method of claim 1, wherein the plurality of validation inputs from the user comprises two or more of: a dynamic password, a movement, a user input, an account security code, a card security code, a social security number, a portion of a social security number, or biometric data.

7. The method of claim 1, further comprising: providing, by the issuer server, a list of available transaction accounts to the digital wallet application.

8. A computer-based system, comprising:

a computing device;

a network server;

an issuer server comprising a processor; and a tangible, non-transitory memory configured to communicate with the processor, the tangible, non-transitory memory having instructions stored thereon that, in response to execution by the processor, cause the issuer server to perform operations comprising:

providing, by the issuer server, a list of available transaction accounts to be added to a digital wallet application;

in response to a user navigating to an add account interface, retrieving, by the issuer server, an alias of a-transaction account from a network server;

determining, by the issuer application, that the transaction account is not associated with the digital wallet application based on a comparison of the alias with a list of transaction accounts corresponding to the digital wallet application;

in response to the determining that the transaction account is not associated with the digital wallet application, displaying, by an issuer application, an add interface for an account not in the digital wallet application;

receiving, by the issuer server, a message from the issuer application indicating a selection to add the transaction account to the digital wallet application;

receiving, by the issuer server, a plurality of validation inputs from the user to unlock an add feature, wherein the issuer server receives the plurality of validation inputs from the issuer application;

determining, by the issuer server, that one or more validation inputs of the plurality of validation inputs match respective expected validation values;

in response to the determining that the one or more validation inputs match the respective expected validation values, sending, by the issuer server, issuer signature criteria to the network server, wherein the issuer signature criteria comprises binary information identifying that the one or more validation inputs match the respective expected validation values;

generating, by the network server, an issuer signature using the issuer signature criteria;

verifying, by the network server, the issuer signature criteria;

transmitting, by the network server, the alias of the transaction account and the issuer signature to the issuer application; and adding, by the issuer application, the transaction account to the digital wallet application.

9. The computer-based system of claim 8, further comprising:

providing, by the issuer server, transaction account information and user information to the computing device for use in the issuer application.

10. The computer-based system of claim 8, wherein a plurality of issuer applications maintained by a plurality of transaction account issuers interact with the network server.

11. The computer-based system of claim 8, wherein the issuer application interacts with the issuer server by calling an application program interface (API) provided by a digital wallet implemented in the computing device.

12. The computer-based system of claim 8, wherein the issuer application calls an application program interface (API) on the computing device using the issuer signature criteria and the alias.

13. The computer-based system of claim 8, wherein the alias is converted into the transaction account number that accesses the transaction account.

14. The computer-based system of claim 8, wherein the plurality of validation inputs from the user comprises two or more of: a dynamic password, a movement, a user input, an account security code, a card security code, a social security number, a portion of a social security number, or biometric data.

15. An article of manufacture including a non-transitory, tangible computer readable storage medium having instructions stored thereon that, in response to execution by an issuer server, cause the issuer server to perform operations comprising:
- providing, by an issuer server, a list of available transaction accounts to be added to a digital wallet application;
- in response to a user navigating to an add account interface, retrieving, by the issuer server, an alias of a transaction account from a network server;
- determining, by the issuer application, that the transaction account is not associated with the digital wallet application based on a comparison of the alias with a list of transaction accounts corresponding to the digital wallet application;
- in response to the determining that the transaction account is not associated with the digital wallet application, displaying by an issuer application an add interface for an account not in the digital wallet application;
- receiving, by the issuer server, a message from the issuer application indicating a selection to add the transaction account to the digital wallet application;
- receiving, by the issuer server, a plurality of validation inputs from the user to unlock an add feature, wherein the issuer server receives the plurality of validation inputs from the issuer application;
- determining, by the issuer server, that one or more validation inputs of the plurality of validation inputs match respective expected validation values;
- in response to the determining that the one or more validation inputs match the respective expected validation values, sending, by the issuer server, issuer signature criteria to the network server, wherein the issuer signature criteria comprises binary information identifying that the one or more validation inputs match the respective expected validation values;
- generating, by the network server, an issuer signature using the issuer signature criteria;
- verifying, by the network server, the issuer signature criteria;
- transmitting, by the network server, the alias of the transaction account and the issuer signature to the issuer application; and
- adding, by the issuer application, the transaction account to the digital wallet application.

16. The article of claim 15, wherein the network server generates an issuer signature using the issuer signature criteria, wherein the issuer signature comprises a time bounded signature that is no longer valid after a predetermined duration.

17. The article of claim 16, wherein the issuer signature is a unique session key.

18. The article of claim 15, wherein the issuer application executed by the computing device queries a digital wallet on the computing device for a list of accounts in the digital wallet application.

19. The article of claim 15, wherein the issuer application is provided by an issuer of a transaction account, and wherein the issuer application is different from the digital wallet application.

20. The article of claim 15, wherein the plurality of validation inputs from the user comprises two or more of: a dynamic password, a movement, a user input, an account security code, a card security code, a social security number, a portion of a social security number, or biometric data.

* * * * *